(12) United States Patent
Allen

(10) Patent No.: US 6,840,004 B1
(45) Date of Patent: Jan. 11, 2005

(54) SYSTEM FOR INJECTING FLUID INTO A WALL OF A STATIC STRUCTURE

(76) Inventor: George R. Allen, 374 Main St., Gloucester, MA (US) 01930

(*) Notice: Subject to any disclaimer, the term of this patent is extended or adjusted under 35 U.S.C. 154(b) by 0 days.

(21) Appl. No.: 10/661,441

(22) Filed: Sep. 15, 2003

(51) Int. Cl.$^7$ .............................................. A01M 13/00
(52) U.S. Cl. ........................ 43/124; 43/132.1; 239/207; 248/49
(58) Field of Search ................................ 43/124, 132.1, 43/127; 248/49, 75; 239/207, 267, 269

(56) References Cited

U.S. PATENT DOCUMENTS

| | | | |
|---|---|---|---|
| 1,997,492 A | | 4/1935 | Lirio |
| 4,137,680 A | | 2/1979 | Doonan |
| D261,357 S | | 10/1981 | Doonan |
| 4,301,629 A | | 11/1981 | Farr |
| 4,501,088 A | | 2/1985 | Boisvert et al. |
| 4,624,070 A | | 11/1986 | Query et al. |
| 5,058,312 A | * | 10/1991 | Jackson ........................ 43/124 |
| 5,058,313 A | * | 10/1991 | Tallon .......................... 43/124 |
| 5,542,207 A | * | 8/1996 | Morris, Sr. ................. 43/132.1 |
| 5,881,493 A | * | 3/1999 | Restive ......................... 43/124 |
| 6,493,987 B1 | * | 12/2002 | Aesch et al. .................. 43/124 |
| 6,701,663 B1 | * | 3/2004 | Hughes et al. ................ 43/124 |

* cited by examiner

Primary Examiner—Peter M. Poon
Assistant Examiner—Bethany L. Griles
(74) Attorney, Agent, or Firm—Donald R. Schoonover

(57) ABSTRACT

Fluid, such as pesticide or the like, can be injected into a wall through each of a plurality of fluid-injection plugs that are mounted on the wall. Each plug includes a blind-ended bore and a fluid passage port that fluidically connects the blind-ended bore to the outside of the plug. A bore-closing plug is releasably mounted on each plug and is removed to provide access to the blind-ended bore and is then replaced to close the plug. Fluid, including air-entrained powdered substances, can be injected into the wall by connecting a suitable supply of the fluid to the blind-ended bore after the plug has been removed and forcing the fluid into the blind-ended bore. The fluid will then pass through the fluid passage port out of the bore and thus be injected into the wall.

5 Claims, 1 Drawing Sheet

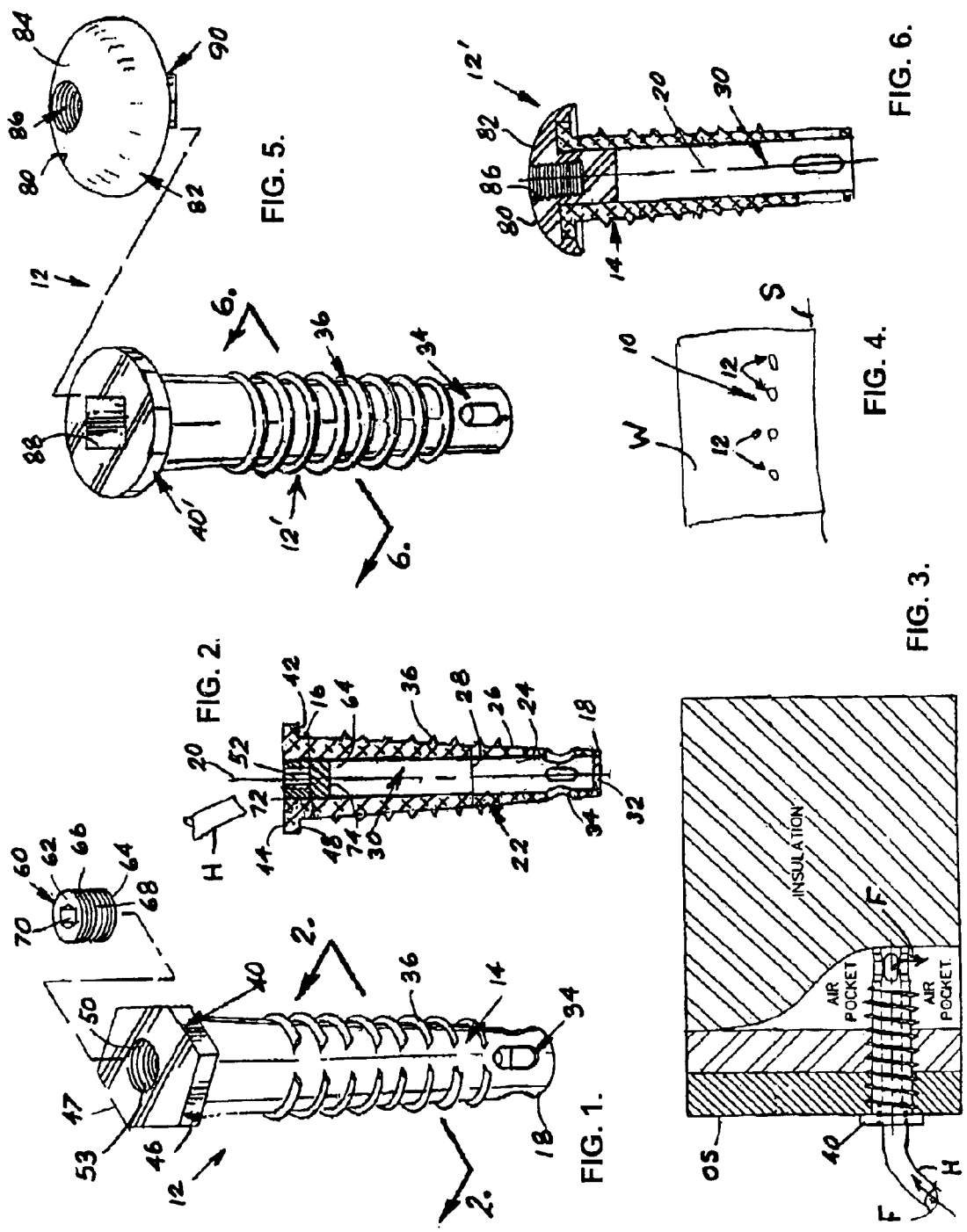

SYSTEM FOR INJECTING FLUID INTO A WALL OF A STATIC STRUCTURE

BACKGROUND OF THE INVENTION

1. Field of the Invention

The present invention relates to the general art of static structures, and to the particular field of accessories for static structures.

2. Discussion of the Related Art

Static structures, such as houses, generally must be protected against invasion of unwanted pests, such as insects. While most structures are very secure against such invasion, pests invariably, over time, find a way to break into the structure. Cracks in the walls, openings drilled for various purposes, such as telephone lines, television lines, electrical lines and the like may be imperfectly sealed and thus provide a path for invasion by such pests. Many walls of static structures are hollow and are filled with insulation and the like and contain wiring and the like.

Therefore, there are numerous treatments for static structures that are used to prevent such invasion. Many of these treatments take advantage of the hollow nature of the walls and include injection of some sort of fluid into the walls. This fluid can be some sort of pesticide or the like.

Most of these treatments require drilling holes into the wall at numerous sites in the walls in order to inject fluid into the walls. These holes are sealed after the treatment has been completed.

While generally effective, these treatments must be repeated every so often to remain effective. The hole drilling/sealing process must be repeated for each treatment. This can be a time consuming process and may even create a possibility that one or more of the holes are not totally sealed. This may expose the interior of the wall to the outside environment. Such exposure may vitiate the purpose of the treatment by presenting a new path for pests to follow into the wall. While the newly-treated wall may prevent the pests from moving into the structure, over time the pest treatment material may lose some of its effectiveness, while the opening remains in place. Thus, the purpose of the treatment may be defeated. Still further, such incompletely-covered holes may expose the interior of a wall to moisture penetration from outside the structure.

Therefore, there is a need for a system for injecting fluid or air-entrained powdered substances into a wall or walls of a static structure, such as a building.

There is further need for such a system that can be securely closed when not being used.

Since drilling and sealing a plurality of holes in a static structure can be time consuming, any system that can make this process more efficient would be desirable.

Therefore, there is a need for a system for injecting fluid or air-entrained powdered substances into a wall or walls of a static structure, such as a building and which can be efficiently mounted on a static structure.

While insects and pesticides have been discussed, those skilled in the art will understand that the system embodying the present invention can be used to inject other fluids, including sealants, and the like, into a wall of a static structure. Furthermore, while buildings have been disclosed and will be used as an example of the type of static structure that is amenable to use of the system embodying the present invention, those skilled in the art will understand from the teaching of the present disclosure that the system embodying the present invention can be used with structures other than buildings and elements other than walls. Accordingly, there is no limitation intended by the use of pests and buildings as examples of the use of the system embodying the present invention.

PRINCIPAL OBJECTS OF THE INVENTION

It is a main object of the present invention to provide a system for injecting fluid or air-entrained powdered substances into a wall or walls of a static structure, such as a building.

It is another object of the present invention to provide a system for injecting fluid or air-entrained powdered substances into a wall or walls of a static structure, such as a building and which can be securely closed when not being used.

It is another object of the present invention to provide a system for injecting fluid or air-entrained powdered substances into a wall or walls of a static structure, such as a building and which can be securely closed when not being used, and which can be securely and efficiently mounted on a static structure.

SUMMARY OF THE INVENTION

These, and other, objects are achieved by a system for injecting material into a wall or walls of a static structure which comprises: a plurality of identical fluid-injecting plugs adapted to be mounted on a wall of a static structure, each fluid-injecting plug including a unitary hollow body having a first end and a second end, a blind-ended bore extending from adjacent to the first end to adjacent to the second end, a fluid passage port located near the second end, the fluid passage port being fluidically connected to the blind-ended bore, a bore-closing plug which is releasably mounted on the body when the plug is in use, the plug closing the blind-ended bore when the plug is in use, and a screw thread on the body, the screw thread being adapted to securely engage the wall to mount the body on the wall when the fluid-injecting plug is in use; and each of the fluid-injection plugs being spaced apart from adjacent fluid-injection plugs and spaced apart from a surface supporting the wall when the fluid-injection plugs are in place on the wall.

The fluid-injecting plugs can be placed on the wall once and then opened as needed. Once fluid, such as pesticide, is injected into the wall through the fluid-injecting plugs, the plugs can be easily, quickly and securely re-closed. If the treatment is repeated, the plugs can be easily and quickly opened, used and then re-closed again. Each plug is securely mounted on the wall and once closed is secure against penetration by pests or moisture.

BRIEF DESCRIPTION OF THE DRAWING FIGURES

FIG. 1 is a perspective view of a fluid-injecting plug that is used in the system embodying the present invention.

FIG. 2 is an elevational view taken along line 2—2 of FIG. 1.

FIG. 3 illustrates a fluid-injecting plug in place.

FIG. 4 illustrates a plurality of fluid-injecting plugs in place on a wall of a static structure.

FIG. 5 is a perspective view of another form of fluid-injecting plug embodying the present invention.

FIG. 6 is an elevational view taken along line 6—6 of FIG. 5.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a system 10 for injecting material, including air-entrained powdered substances, into a wall W or walls of a static structure that is mounted on a supporting surface S. System 10 comprises a plurality of identical fluid-injecting plugs, such as fluid-injecting plug 12. The fluid-injecting plugs 12 are each adapted to be mounted on at least one wall of the static structure.

Each fluid-injecting plug 12 includes a hollow body 14 having a first end 16, a second end 18, and a longitudinal axis 20 which extends between the first end 16 of the body 14 and the second end 18 of the body 14. A unitary and continuous tubular wall 22 connects the first end 16 of the body 14 to the second end 18 of the body 14. The wall 22 has an inner surface 24 and an outer surface 26 with the outer surface 26 having an outer dimension 28 measured transverse to the longitudinal axis 20. Outer dimension 28 of the wall 22 decreases from a first size 28' adjacent to the first end 16 of the body 14 to a second size 28" adjacent to the second end 18 of the body 14 so the wall 22 tapers from the first end 16 of the body 14 to the second end 18 of the body 14.

A blind-ended bore 30 is defined inside the hollow body 14. Blind-ended bore 30 extends from adjacent to the first end 16 of the body 14 to adjacent to the second end 18 of the body 14 and is closed by a cap 32 adjacent to second end 18 of the body 14.

A plurality of fluid passage ports, such as fluid passage port 34, are defined through the wall 22 from the outer surface 26 of the wall 22 to the inner surface 24 of the wall 22 adjacent to the second end 18 of the body 14. The fluid passage ports 34 fluidically connect the blind-ended bore 30 to the cuter surface 26 of the wall 22 adjacent to the second end 18 of the body 14.

A threadlike anchor rib 36 is located on the outside surface 26 of the wall 22 and extends around the body 14 and also extends from adjacent to the first end 16 of the body 14 to adjacent to the second end 18 of the body 14. The threadlike anchor rib 36 is adapted to engage wall W and securely mount the body 14 on the wall when the injection plug 12 is in place on the wall as shown in FIG. 3.

A head 40 is is located on the first end 16 of the body 14. Head 40 is unitary and one-piece with the wall 22 of the body 14. Head 40 has a first surface 42 that is located adjacent to the first end 16 of the hollow body 14. First surface 42 of the head 40 is one-piece with the body 14 so the overall plug 12 is quite strong and is not susceptible to openings that may allow penetration by moisture or pests.

The head 40 has a second surface 44 and a thickness dimension 46 that extends between the first surface 42 of the head 40 and the second surface 44 of the head 40 in the direction of the longitudinal axis 20 of the body 14. The head 40 further includes an outer perimeter 47 which is larger than the outer dimension 28 of the wall 22 adjacent to the first end 16 of the body 14. Head 40 further includes a seating flange area 48 on the first surface 42 of the head 40 between the outer surface 26 of the wall 22 of the body 14 adjacent to the first end 16 of the hollow body 14 and the outer perimeter 47 of the head 40. As shown in FIG. 3, the seating flange area 48 engages the outer surface OS of the wall and closes any hole defined through the wall to further seal that hole and prevent penetration into the wall.

A through-bore 50 is defined through the head 40 from the first surface 42 of the head 40 to the second surface 44 of the head 40. The through-bore 50 has a central axis 52 that is aligned with the longitudinal axis 20 of the hollow body 14. The through-bore 50 fluidically connects the blind-ended bore 30 to the area adjacent to the through-bore 50 and adjacent to the second surface 44 of the head 40. A screw thread 53 is located on the head 40 adjacent to the through-bore 50. A fluid-dispensing conduit, such as hose H, is fluidically connected to the through-bore 50 to be fluidically connected to blind-ended bore 30. Fluid dispensed from hose H thus is directed into the blind-ended bore 30 and from the blind-ended bore 30 into the wall via ports 34 as indicated in FIG. 3 by arrows F.

A through-bore plug 60 is mounted in the through-bore 50 when the through-bore plug 60 is in place to close the blind-ended bore 50. The through-bore plug 60 includes a first end 62 that is located adjacent to the outer surface 44 of the head 40 when the through-bore plug 60 is in place, a second end 64 that is located inside the through-bore 50 when the through-bore plug 60 is in place, and a wall 66 that connects the first end 62 of the through-bore plug 60 to the second end 64 of the through-bore plug 60. A through-bore plug screw thread 68 is located on the wall 66 of the through-bore plug 60. The through-bore plug screw 68 is sized to threadably engage the screw thread 53 on the head 40 when the through-bore plug 60 is in place to threadably and removably secure the through-bore plug 60 in place on the head 40.

A tool-engaging opening 70 is defined in the through-bore plug 60. Tool-engaging opening 70 extends from the first end 62 of the through-bore plug 60 toward the second end 64 of the through-bore plug 60 and has an open end 72 that is located adjacent to the outer surface 44 of the head 40 when the through-bore plug 60 is in place, and a closed end 74 that is located inside the through-bore 50 to close the through-bore 50 when the through-bore plug 60 is in place on the head 40.

As indicated in FIG. 4, each of the fluid-injection plugs 12 is spaced apart from adjacent fluid-injection plugs 12 and is spaced apart from surface supporting the wall when the fluid-injection plugs 12 are in place on the wall.

One form of fluid-injecting plug 12' is shown in FIGS. 5 and 6 having a cap 80 that has a hemispherical body 82 with surface 84 being arcuate. A threaded circular hole 86 is defined through cap 80 and a polygonal hole 88 is defined in head 40'. A polygonal projection 90 is received in hole 88 to lock cap 80 to head 40, as shown in FIG. 6. Operation of plug 12' is identical to the above-described plug 12 and thus will not be described in detail, with reference being made to the preceding description.

It is understood that while certain forms of the present invention have been illustrated and described herein, it is not to be limited to the specific forms or arrangements of parts described and shown.

What is claimed and desired to be covered by Letters Patent is as follows:

1. A system for injecting material, including air-entrained powdered substances, into a wall or walls of a static structure comprising:
  a) a plurality of identical fluid-injecting plugs adapted to be mounted on at least one wall of a static structure, each fluid-injecting plug including
    (i) a hollow body having
      (A) a first end,
      (B) a second end, (C) a longitudinal axis extending between the first end of the body and the second end of the body, (D) a unitary and continuous tubular wall connecting the first end of the body to the second end of the body, the wall having an inner surface and an outer surface, the outer surface having an outer dimension measured transverse to the longitudinal axis, (E) the outer dimension of the wall decreasing from a first size adjacent to the first end of the body to a second size adjacent to the second end of the body so the wall tapers from the first end of the body to the second end of the body, (F) a blind-ended bore defined inside the hollow body, the blind-ended bore extending from adjacent to the first end of the body to adjacent to the second end of the body and being closed adjacent to the second end of the body, (G) a plurality of fluid passage ports defined through the wall from the outer surface of the wall to the inner surface of the all adjacent to the second end of the body, the fluid passage ports fluidically connecting the blind-ended bore to the outer surface of the wall adjacent to the second end of the body, and (H) a threadlike anchor rib located on the outside surface of the wall and extending around the body and extending from adjacent to the first end of the body to adjacent to the second end of the body, the threadlike anchor rib being adapted to engage the wall and securely mount the body on the wall when the injection plug is in place on the wall, (ii) a head that is located on the first end of the body and is unitary and one-piece with the wall of the body, the head having (A) a first surface located adjacent to the first end of the hollow body, the first surface of the head being one-piece with the body, (B) a second surface, (C) a thickness dimension that extends between the first surface of the head and the second surface of the head in the direction of the longitudinal axis of the body, (D) an outer perimeter, the outer perimeter of the head being larger than the outer dimension of the wall adjacent to the first end of the body, (E) a seating flange area on the first surface of the head between the outer surface of the wall of the body adjacent to the first end of the hollow body and the outer perimeter of the head, (F) a through-bore defined through the head from the first surface of the head to the second surface of the head, the through-bore having a central axis that is aligned with the longitudinal axis of the hollow body, the through-bore fluidically connecting the blind-ended bore to the area adjacent to the through-bore and adjacent to the second surface of the head, and (G) a screw thread on the head adjacent to the through-bore, (iii) a through-bore plug that is mounted in the through-bore when the through-bore plug is in place, the through-bore plug including (A) a first end that is located adjacent to the outer surface of the head when the through-bore plug is in place, (B) a second end that is located inside the through-bore when the through-bore plug is in place, (C) a wall connecting the first end of the through-bore plug to the second end of the through-bore plug, (D) a through-bore plug screw thread on the wall of the through-bore plug, the through-bore plug screw being sized to threadably engage the screw thread on the head when the through-bore plug is in place to threadably and removably secure the through-bore plug in place on the head, (E) a tool-engaging opening in the through-bore plug, the tool-engaging opening extending from the first end of the through-bore plug toward the second end of the through-bore plug and having an open end that is located adjacent to the outer surface of the head when the through-bore plug is in place and a closed end that is located inside the through-bore to close the through-bore when the through-bore plug is in place on the head; and b) each of said fluid-injection plugs being spaced apart from adjacent fluid-injection plugs ard spaced apart from a surface supporting the wall when the fluid-injection plugs are in place on the wall.

2. The system as described in claim 1 wherein the through-bore in the head is circular.

3. The system as described in claim 1 wherein the through-bore in the head is polygonal.

4. The system as described in claim 1 wherein the through-bore plug includes a cylindrical body and the first end is planar.

5. The system as described in claim 1 wherein the through-bore plug includes a hemispherical body and the first end is arcuate.

* * * * *